United States Patent
Newarski

[19]

[11] Patent Number: 5,542,401
[45] Date of Patent: Aug. 6, 1996

[54] INTERNAL COMBUSTION ENGINE CRANKCASE VACUUM METHOD AND APPARATUS

[75] Inventor: Emil J. Newarski, Chandler, Ariz.

[73] Assignee: En-Ovation Technology, Inc., Chandler, Ariz.

[21] Appl. No.: 336,463

[22] Filed: Nov. 9, 1994

[51] Int. Cl.$^6$ .................................................. F02M 25/06
[52] U.S. Cl. ............................................................. 123/572
[58] Field of Search .................................. 123/572, 573, 123/574; 137/907, 516.25, 517, 509, 505.38

[56] References Cited

U.S. PATENT DOCUMENTS

| | | | |
|---|---|---|---|
| 2,984,226 | 5/1961 | Court | 123/41.31 |
| 3,145,697 | 8/1964 | Barr et al. | 123/574 |
| 3,165,097 | 1/1965 | Lowther . | |
| 3,179,097 | 4/1965 | Jackson | 123/574 |
| 3,202,145 | 8/1965 | Paolo . | |
| 3,263,660 | 8/1966 | Hyde . | |
| 3,380,441 | 4/1968 | Lewis . | |
| 3,455,285 | 7/1969 | Sheppard . | |
| 3,550,567 | 12/1970 | Crow | 123/41.86 |
| 3,626,977 | 12/1971 | Riley | 137/516.25 |
| 3,659,573 | 5/1972 | Bennett . | |
| 3,673,994 | 7/1972 | Aono . | |
| 3,754,538 | 8/1973 | Ephraim, Jr. et al. | 123/41.86 |
| 3,924,588 | 12/1975 | Hager . | |
| 4,158,353 | 6/1979 | Darnell . | |
| 4,257,383 | 3/1981 | Boswell | 123/574 |
| 4,373,499 | 2/1983 | Bendig | 123/574 |
| 4,603,673 | 8/1986 | Hiraoka et al. | 123/573 |
| 4,656,991 | 4/1987 | Fukuo et al. | 123/572 |
| 4,721,090 | 1/1988 | Kato | 123/572 |
| 4,760,833 | 8/1988 | Tatyrek | 123/574 |
| 5,076,322 | 12/1991 | Choksi et al. | 137/907 |
| 5,080,082 | 1/1992 | Mueller et al. | 123/574 |
| 5,335,641 | 8/1994 | Schnabel | 123/574 |
| 5,347,973 | 9/1994 | Walker | 123/574 |

*Primary Examiner*—Marguerite McMahon
*Attorney, Agent, or Firm*—O'Connor Cavanagh

[57] ABSTRACT

An apparatus and method are provided for maintaining a substantially constant partial vacuum in the crankcase of an internal combustion engine. Maintaining the partial vacuum, in addition to essentially eliminating crankcase emissions, substantially reduced tailpipe emissions of carbon monoxide and unburned hydrocarbons as evidenced by a test conducted according to California Air Research Board test method 505 (hot). The crankcase partial vacuum also has the added benefit of reducing the rate at which the engine lubricating oil was contaminated.

7 Claims, 2 Drawing Sheets

INTERNAL COMBUSTION ENGINE CRANKCASE VACUUM METHOD AND APPARATUS

BACKGROUND OF THE INVENTION

This invention relates to emission control systems for internal combustion engines, specifically to methods and apparatus for reducing emissions attributable to the imperfect seal that inherently exists between the pistons and cylinders of an internal combustion engine having reciprocating pistons.

Imperfect sealing inherently exists between the pistons and cylinders of reciprocating-piston internal combustion engines, such as those used in most automobiles. This imperfect sealing results in a certain portion of the combustion gases leaking past the pistons into the crankcase of the engine. Historically, these combustion gases were vented into the atmosphere to prevent build-up of excessive pressure in the crankcase and, especially in larger industrial and marine engines, to prevent the build-up of combustible gases in the crankcase, which could lead to a crankcase explosion. Venting of crankcase gases, however, resulted in a substantial quantity of unburned hydrocarbons being released into the atmosphere.

In the late 1950's positive crankcase ventilation (PCV) systems began to be incorporated into automobile engine systems as an alternative to atmospheric venting. PCV systems draw air through a breather into the crankcase where the air mixes with the combustion gases accumulating in the crankcase. This mixture is then drawn out of the crankcase into the intake manifold of the engine from whence it is then admitted to the combustion chamber and re-burned along with a fresh charge of air-fuel mixture. By circulating the combustion gases from the crankcase back into the combustion chamber, the escape of unburned hydrocarbons directly from the crankcase into the atmosphere is essentially eliminated.

Various methods have been devised for metering the flow of this mixture into the intake manifold for re-combustion. U.S. Pat. No. 3,445,285 to Sheppard discloses a metering valve that adjusts the flow rate in response to crankcase pressure while remaining relatively unaffected by intake manifold vacuum. U.S. Pat. No. 3,165,097 to Lowther discloses a metering valve responsive to intake manifold vacuum that operates between two relatively restrictive positions and a relatively non-restrictive position. All PCV systems rely on the admitting of fresh air into the crankcase to mix with combustion gases before the gases are re-burned.

It has also been recognized that combustion gases entering the crankcase are a primary source of contaminants that foul the engine lubricating oil. U.S. Pat. No. 4,760,833 to Tatyrek discloses that maintaining a partial vacuum in the crankcase reduces the rate at which the lubricating oil is contaminated by combustion gases.

No prior art appears to recognize, however, that the imperfect seal between the piston and cylinder, in addition to permitting the escape of combustion gases into the crankcase, permits a reverse flow of lubricating oil and other contaminants from the crankcase into the combustion chamber. This reverse flow of contaminants is believed to result in an increase in tailpipe emissions, especially carbon monoxide. The effect of this reverse flow of contaminants is exacerbated by the imperfect seal that also exists between the vane stems and vane guides of the engine, which also permit lubricating oil and other contaminants to-enter the combustion chamber.

Accordingly, a principal object of the present invention is to provide a method and apparatus for reducing both crankcase emissions and tailpipe emissions attributable to the imperfect sealing between the pistons and cylinders and between the valve stems and guides of internal combustion engines, by maintaining a substantially constant partial vacuum in the crankcase.

Another objective of the present invention is to reduce the rate at which engine oil is contaminated by combustion gases, without adversely affecting tailpipe or crankcase emissions.

SUMMARY OF THE INVENTION

According to the present invention, both crankcase emissions and tailpipe emissions of an internal combustion engine are reduced by maintaining a partial vacuum in the engine crankcase. This is accomplished by using a vacuum source to draw combustion gases from the crankcase through a vacuum regulator and injecting the gases into the combustion air intake of the engine. In one embodiment of the present invention, the vacuum source is the intake manifold of a throttled engine. The engine crankcase may also be substantially sealed to limit the amount of gas that must be drawn into the intake manifold in order to maintain the appropriate vacuum in the crankcase. Reducing the amount of gas entering the intake manifold reduces the potentially adverse effect the recirculated mixture has on tailpipe emissions.

In another embodiment of the present invention especially suited to diesel cycle engines, which commonly do not have a throttled intake, the vacuum source may be a vacuum pump. The discharge from the vacuum pump is directed into the intake manifold of the engine for introduction into the engine combustion chamber for re-combustion. Alternately, the vacuum source may be a venturi in the air intake itself.

Maintaining a crankcase vacuum has the incidental benefits of reducing the rate of contamination of the engine lubricating oil and reducing oil leaks into the environment.

BRIEF DESCRIPTION OF THE DRAWINGS

The above and other objects, aspects, features and attendant advantages of the present invention will become apparent from a consideration of the ensuing detailed description of presently preferred embodiments and methods thereof, taken in conjunction with the accompanying drawings, in which.

DESCRIPTION OF PREFERRED EMBODIMENTS AND METHODS

Figures 1A, 1B:
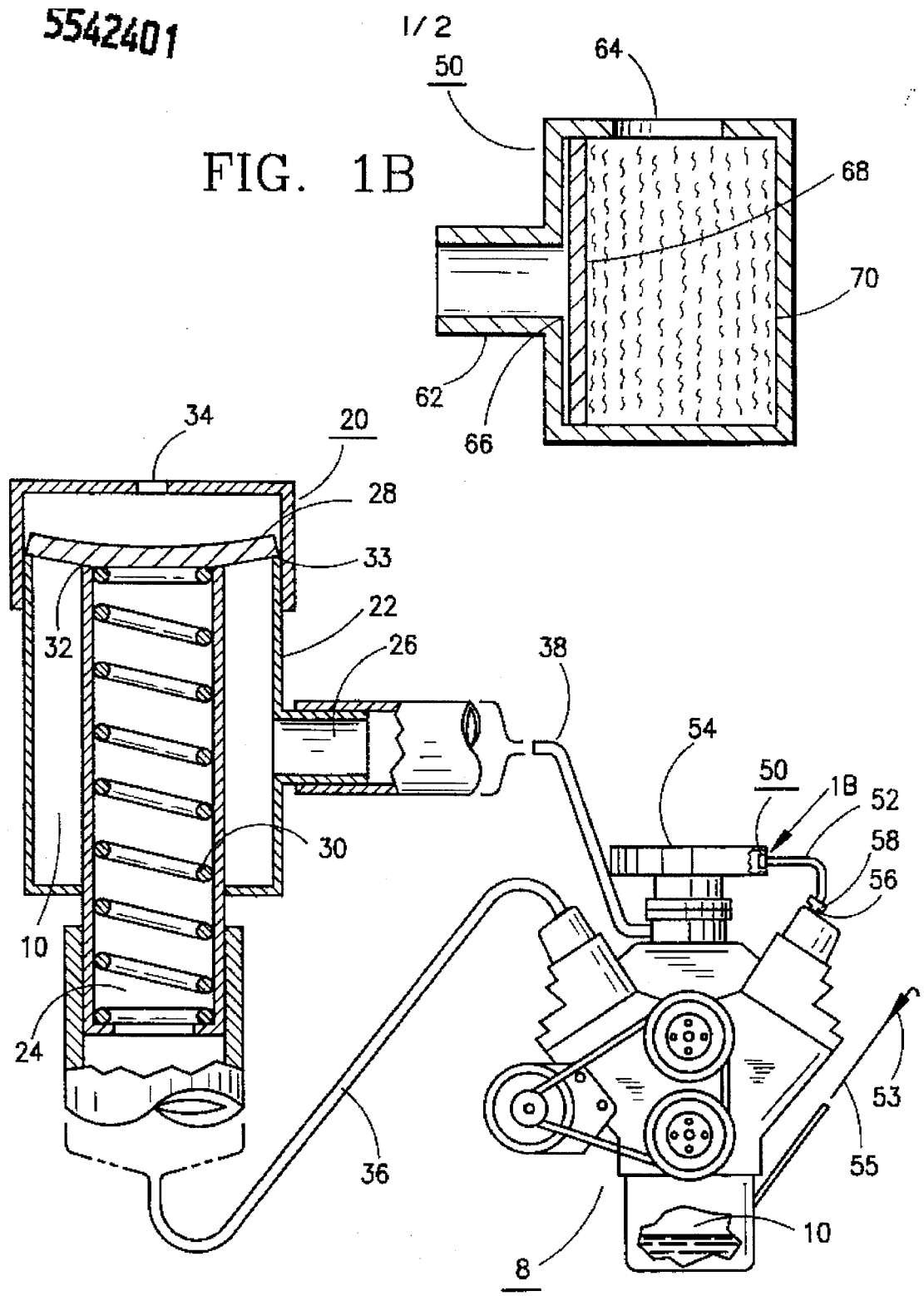
FIG. 1A is a schematically represented throttled internal combustion engine demonstrating the principles of the present invention.
FIG. 1B is an enlarged partial cross sectional view of an overload check valve according to the present invention denoted by arrow 1B.

Although the utility of operating an engine crankcase at a partial vacuum is known for limiting leakage of oil from the engine, for reducing the rate at which lubricating oil is contaminated by combustion gases, and for reducing emission of crankcase gases directly into the atmosphere, it is quite unexpected that operation of an engine crankcase at a partial vacuum would reduce tailpipe emissions as well.

It is believed that the imperfect seal that exists between a piston and cylinder of a reciprocating-piston internal combustion engine, in addition to allowing combustion gases to leak into the crankcase, also permits the flow of lubricating oil and other contaminants into the combustion chamber. In multicylinder engines, this flow of contaminants may be exacerbated by pressure pulses within the crankcase that result from combustion gases leaking from other cylinders. In addition to this flow past the pistons, a reverse flow of oil and contaminants often leaks between the valve stems and the valve guides into the combustion chamber. The lubricating oil and other contaminants that leak into the combustion chamber, being poor fuels, upset the air/fuel ratio and/or burn incompletely, with a commensurate increase in the unburned hydrocarbons and carbon monoxide exhausted. Maintaining a substantially constant partial vacuum in the crankcase, in addition to completely eliminating crankcase emissions, substantially reduces tailpipe emissions, which are believed to be caused in part by this reverse flow of contaminants. Additionally, the partial vacuum maintained in the crankcase has the added benefit of reducing the rate at which the engine lubricating oil is contaminated, and reduces oil leaks into the environment.

FIG. 1 schematically represents an embodiment of the present invention which includes throttled internal combustion engine 8 having crankcase 10 and a combustion air intake, preferably an intake manifold 12. During operation of the engine, combustion gases leaking past the piston/ cylinder interface accumulate in crankcase 10 and are withdrawn via tube 36, through vacuum regulator 20, and then via tube 38 into intake manifold 12, where they are mixed with a fresh charge of air-fuel mixture and re-burned. Overload check valve 50, is in a normally closed position, thereby preventing substantial infusion of fresh air into crankcase 10. It should be noted that the use of tubes in the embodiment of FIG. 1 is not intended as a limitation and that any functionally equivalent substitute will not affect the operation of the present invention. For example, in place of tube 36, vacuum regulator 20 may be mounted directly on the engine 8.

Vacuum regulator 20 comprises housing 22, which may be made of durable metal or plastic, but preferably is made of high-temperature thermoplastic. Housing 22 includes inlet 24 and outlet 26 which, in the present embodiment are connectable to tube 36 and tube 38 respectively. Housing 22 further includes outer valve seat 33. Inlet 24 includes inner valve seat 32, which is recessed from the level of outer valve seat 33. Valve 28 comprises a resilient disk which may be made of an elastomeric compound, preferably neoprene. Valve 28 is urged away from valve seats 32 and 33 by elastic member 30, which may be a conventional metal spring, rubber, or other elastic material. Aperture 34 permits communication between atmospheric pressure and the upper side of valve 28 to urge valve 28 toward valve seats 32 and 33 when vacuum levels in vacuum regulator 20 reach a predetermined level.

In operation, when the vacuum in crankcase 10 falls below a predetermined level, usually about ½ to 2½ inches of mercury (inches Hg), elastic member 30 moves valve 28 away from valve seats 32 and 33 thereby opening communication between intake manifold 12 and crankcase 10. The vacuum present in intake manifold 12 draws the gases from crankcase 10 into intake manifold 12 which then conveys the gases into the combustion chambers for re-combustion. As the gases are withdrawn through regulator 20, the vacuum in crankcase 10 increases. At a predetermined level above about ½ inch Hg, but preferably between one and seven inches Hg, and most preferably about two to three inches Hg, the vacuum is sufficient to overcome the urging of elastic member 30, thereby forcing valve 28 first against outer valve seat 33 and then, by deforming valve 28, forcing it against inner valve seat 32, thereby sealing intake manifold 12 from crankcase 10. The design of the regulator is such that the annular area 40 is small in comparison to the area across inlet 24. Accordingly, the influence of the vacuum in intake manifold on the operation of regulator 20 is minimized relative to the effect of the vacuum level in crankcase 10. Accordingly, regulator 20 is able to regulate vacuum in crankcase 10 at an appropriate predetermined range substantially independent of the vacuum level in intake manifold 12. In an alternate embodiment of regulator 20, resilient member 30 is eliminated entirely and the level at which the regulator 20 closes is determined solely by the resiliency of valve 28. Other more complex regulator designs may also be substituted for regulator 20 without affecting the operation of the present invention.

Under certain conditions, combustion gases entering crankcase 10 may be of too great a volume to be drawn through regulator 20 into intake manifold 12 without affecting engine performance. This condition generally occurs only when a badly worn engine is operating at or near full load or when a failure such as a broken piston occurs. To prevent the flow of crankcase gases from causing a pressure build-up in the crankcase, if crankcase pressure rises measurably above ambient, overload check valve 50, vents crankcase gases to the atmosphere, either into a container such as a charcoal canister that will prevent escape of the gases into the environment, or preferably into the air filter housing 54, where the gases will ultimately be drawn into intake manifold 12 and reburned.

FIG. 1B shows a cross section of overload check valve 50. Valve 50 comprises a housing 60 having inlet 62 and outlet 64. Inlet 62 further includes valve seat 66. Valve 68 comprises a flexible disk rigidly mounted to housing 60 in a juxtaposed, spaced-apart configuration. Valve 68 is urged against valve seat 66 by a resilient member 70, which may be a metal spring, but preferably is a volume of compressed filter material. Inlet 62 is in communication with crankcase 10 via tube 52 through oil filler cap 58, which is sealed by resilient seal 56 to the engine. Alternately, oil filler cap 58 may be sealed, in which case inlet 62 is in communication with crankcase 10 via tube 52 attached directly to the engine 8. Valve 50 is preferably mounted inside air filter housing 54 so that any exhausted gases will be drawn back into intake manifold 12 and reburned.

In normal operation, vacuum appearing in crankcase 10 is communicated to inlet 62. The vacuum acts to close valve 50 for proper operation of the invention. In the event of extreme build-up of combustion gases in the crankcase, such as that caused by a badly worn engine operating under full load, or a broken piston, the vacuum that acts to close valve 50 is relieved permitting the valve to open and exhaust crankcase gases through the resilient filter material and into the air filter housing 54, where it is drawn past the throttle and into the intake manifold.

Depending on the particular vehicle, to reduce the rate at which gases must be withdrawn in order to maintain the appropriate vacuum level, additional measures may be taken to eliminate or reduce infusion of fresh air into crankcase 10.

Such measures include incorporating a resilient plug 53 on dipstick 55 and a seal 56 on oil filler cap 58. These measures are usually sufficient for operation of an engine crankcase vacuum of approximately 1 to 7 inches Hg. For operation at higher vacuum levels, other seals may be required to be re-engineered. Typically the rotating seals at the ends of the crankshaft must be improved to prevent substantial air infusion at crankcase vacuum levels above 7 inches Hg. Rotating face seals or other pressure seals of a type suitable for this application are well known in the art.

Figure 2B:
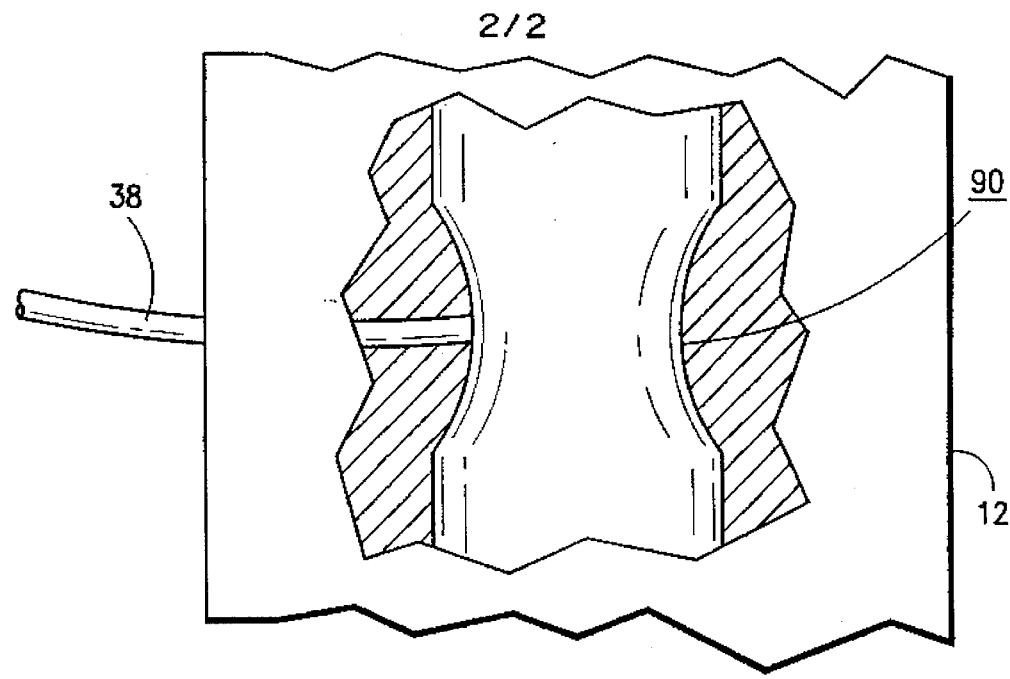
FIG. 2B is an enlarged cross sectional view of a venturi used as a vacuum source according to the present invention denoted by arrow 2B.
Figure 2A:
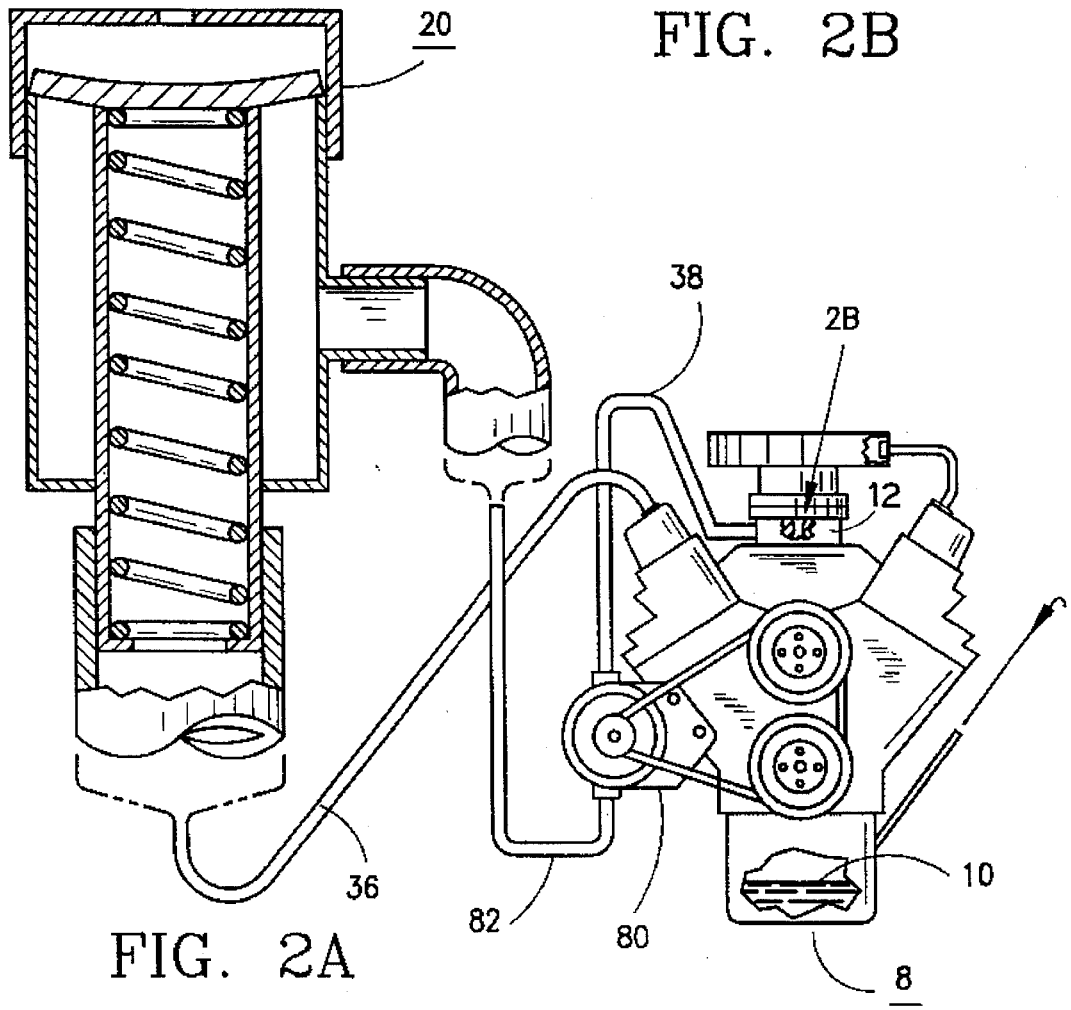
FIG. 2A is a schematically represented unthrottled internal combustion engine demonstrating an alternate embodiment of the present invention.

FIG. 2A shows an embodiment of the present invention adapted for use with unthrottled internal combustion engines, including diesel cycle engines, in which the intake manifold is not useable as a vacuum source. The embodiment includes a vacuum pump 80, which draws combustion gases from crankcase 10 via tube 36 through vacuum regulator 20 and through intermediate tube 82. The gases are then injected via tube 38 into the air stream entering the engine, preferably directly into the intake manifold 12.

FIG. 2B shows an additional embodiment of the present invention in which the vacuum source is provided by a fixed venturi 90 in the air stream entering the engine through intake manifold 12. The operation of a venturi is well known in the art.

By operating the engine crankcase at a substantially constant partial vacuum according to the present invention, it has been observed that the rate of oil contamination is reduced by a factor of approximately 53%. Moreover, emissions of hydrocarbons are reduced on the order of 17% percent and carbon monoxide emissions are reduced on the order of 31% percent as evidenced by the following test results conducted according to California Air Research Board testing procedure 505 (hot) on a 1994 Oldsmobile Cutlass engine family R1G3.1V8GFEA having 16,061.1 miles.

|  | THC | CO | NOx | CO2 | NMHC |
|---|---|---|---|---|---|
| Without Device | .054 | .596 | .219 | 402.09 | .039 |
| With Device | .045 | .409 | .216 | 405.52 | .031 |

Where THC is total hydrocarbons, CO is carbon monoxide, NOx is oxides of nitrogen, CO2 is carbon dioxide and NMHC is non-methane hydrocarbons. All units are in grams per mile. The positive effects of the present invention are even more dramatic on older and/or higher mileage vehicles.

Other methods of maintaining vacuum in the crankcase may also be possible according to the present invention. One such possibility would be to maintain relatively unrestricted communication between the intake manifold and crankcase. The crankcase vacuum would then be maintained by direct regulation of air admitted to the crankcase. This method, however, would require a substantially greater volume of crankcase gas to be ingested by the intake manifold and could have an adverse effect on other engine controls and emissions systems.

Although certain preferred embodiments and methods have been disclosed herein, it will be apparent from the foregoing disclosure to those skilled in the art that variations and modifications of such embodiments and methods may be made without departing from the true spirit and scope of the invention. Accordingly, it is intended that the invention shall be limited only to the extent required by the appended claims and the rules and principles of applicable law.

What is claimed is:

1. A method for reducing crankcase and tailpipe emissions from an internal combustion engine having a crankcase and a combustion air intake comprising:

drawing combustion gases from the crankcase through a vacuum regulator and injecting the gases into the air intake to maintain the crankcase at a predetermined partial vacuum, said predetermined partial vacuum having no more than 1.25 inches Hg of variation from a nominal value, said nominal value being between 1–7 inches Hg, irrespective of engine operating conditions; and substantially sealing at least the major openings in the engine to limit the amount of crankcase gases that must be withdrawn through the vacuum regulator and injected into the air intake to maintain said partial vacuum.

2. The method of claim 1 in which the air intake is an intake manifold of a throttled engine and the drawing of the combustion gases is through a vacuum regulator by intake manifold vacuum.

3. The method of claim 1 in which the air intake is an unthrottled diesel engine manifold and the gases are drawn through the vacuum regulator by an engine-operated pump.

4. In combination with an internal combustion engine having a crankcase and a throttled intake manifold providing a vacuum source, an exhaust emissions reducing apparatus comprising:

means for communicating gas flow from the crankcase to the intake manifold;

a vacuum regulator operatively disposed along said communicating means for regulating a vacuum in said crankcase at a predetermined vacuum level between 1–7 inches Hg, substantially irrespective of engine operating conditions, said vacuum regulator comprising a housing having a first valve seat, an inlet port, and an outlet port, the outlet port connectable to the intake manifold, the inlet port connectable to the crankcase and further including a second valve seat, a sealing member comprising a disk of resilient material slidably disposed within the housing spaced-apart from the first and second valve seats, and means for urging the sealing member away from the second valve seat with a predetermined force, said resilient member cooperating with vacuum at said inlet port to close said valve at a predetermined vacuum level; and means for substantially sealing the engine crankcase to prevent excessive inflow of air from the atmosphere.

5. The apparatus of claim 4 wherein the predetermined vacuum level is maintained with no more than 1.25 inches Hg of variation.

6. In combination with an internal combustion engine having a crankcase and a combustion air intake, an exhaust emissions reducing apparatus comprising:

means for communicating gas flow from the crankcase to the combustion air intake;

means for substantially sealing the engine crankcase to prevent substantial inflow of air from the atmosphere;

a pump for urging gas to flow from the crankcase to the combustion air intake; and a vacuum regulator operatively disposed along said communicating means for regulating a vacuum in said crankcase at a predetermined vacuum level between 1–7 inches Hg, substantially irrespective of engine operating conditions, said vacuum regulator comprising a housing having a first valve seat, an inlet port, and an outlet port, the outlet port connectable to the intake manifold, the inlet port connectable to the crankcase and further including a second valve seat, a sealing member comprising a disk of resilient material slidably disposed within the housing spaced-apart from the first and second valve seats and means for urging the sealing member away from the second valve seat with a predetermined force, said resilient member cooperating with vacuum at said inlet port to close said valve at a predetermined vacuum level; and means for substantially sealing the engine crankcase to prevent excessive inflow of air from the atmosphere.

7. The apparatus of claim 6 wherein the predetermined vacuum level is maintained with no more than 1.25 inches Hg of variation.

* * * * *